United States Patent Office 3,437,328
Patented Apr. 8, 1969

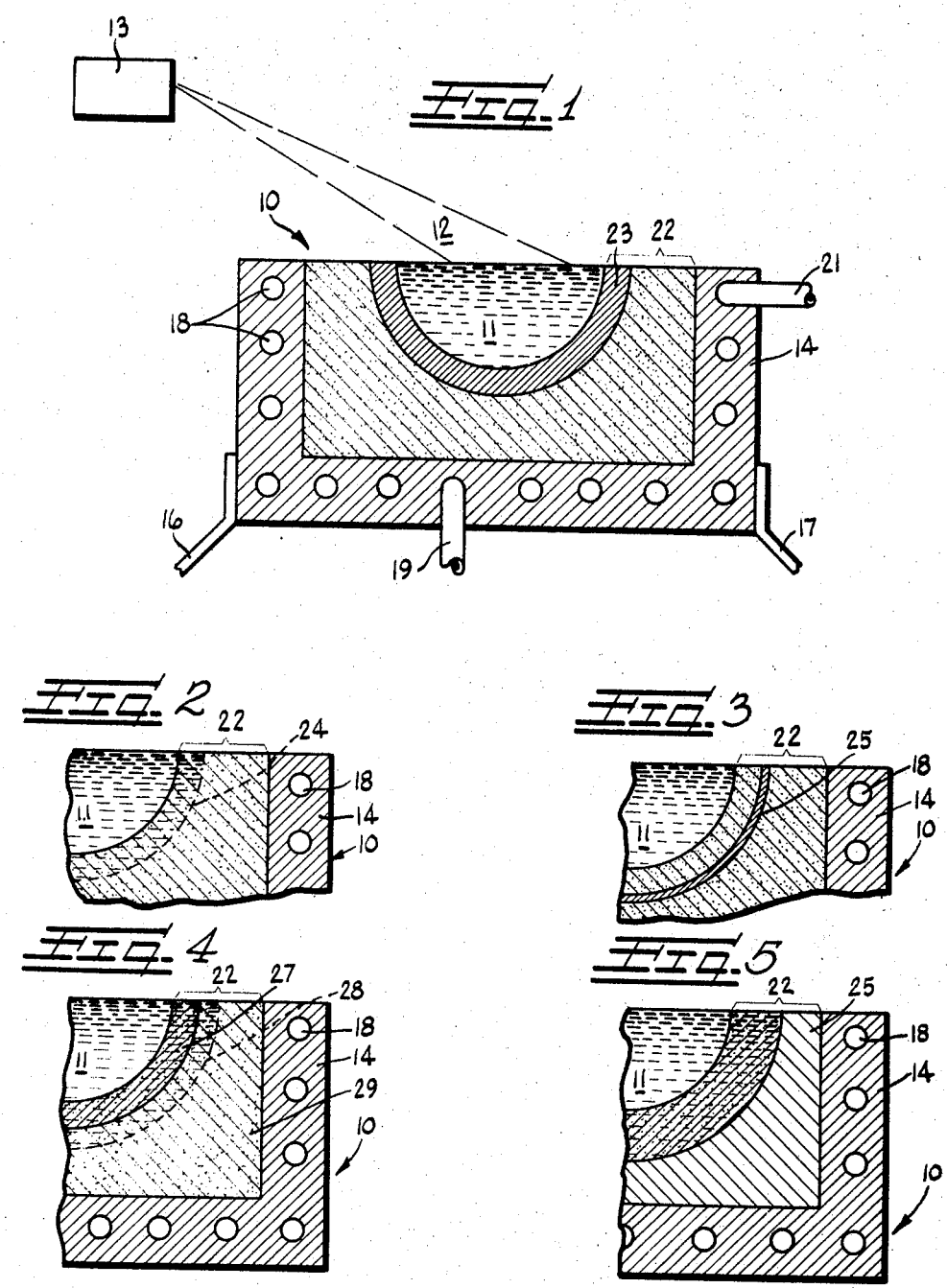

3,437,328
POWDER CRUCIBLES
Kurt David Kennedy, Walnut Creek, and Hugh R. Smith, Jr., Piedmont, Calif., assignors, by mesne assignments, to Air Reduction Company, Incorporated, a corporation of New York
Filed Apr. 13, 1967, Ser. No. 630,642
Int. Cl. F27d 1/10; F27b 14/06
U.S. Cl. 263—48                                13 Claims

ABSTRACT OF THE DISCLOSURE

Apparatus is described for evaporation of material from a molten pool, by surface heating. The apparatus utilizes an inert material in particulate form between the molten pool and a cooled outer receptacle to prevent the material in the pool from forming a thermal "short circuit" to the outer receptacle.

---

This invention relates to the surface heating of material in a molten pool for evaporation and the like. More particularly, the invention relates to a crucible of improved thermal efficiency adapted to contain molten material.

Many materials, when in their molten state, are difficult to satisfactorily contain for certain purposes. This is because the molten material reacts with the container material, such as a refractory material, to produce impurities which contaminate the melt and, in some cases, such reaction may have a detrimental effect on the integrity of the container itself. One solution to this problem, which has heretofore been applied in surface heating systems such as heating by electric arc and electron beams, is the utilization of a cooled crucible, such as a water cooled copper crucible, for containing the melt. Heating is carried out by an electric arc or electron beams directed at the surface of the molten pool of material and a temperature gradient exists from the heated surface area to the cooled crucible walls. The material thereby remains solid along the inner surface of the cooled crucible to form a "skull" of the same material as the molten pool. The skull is, of course, non-reactive with the molten material and with the crucible, thereby preserving the purity of the melt.

Although successful in many applications, the above described technique is occasionally beset by problems of thermal inefficiency. The inner skull surface is constantly being washed by hot molten material in the pool due to convection currents produced by the surface heating. The flow of convecting molten material along the skull constantly transfers heat to the skull from the hot surface of the molten pool. This rapid transfer of heat to the skull and from thence to the cooled walls of the crucible sometimes necessitates expenditure of excessive amounts of power to maintain a desired temperature in the molten pool. The thermal inefficiencies described may be tolerable in certain circumstances, but in some situations, particularly in large scale production type vacuum evaporation systems, thermal inefficiency may render the system impractical because of excessive power costs necessary to maintain the melt at a desired temperature.

Heretofore, thermal inefficiencies associated with cooled crucibles have been reduced by the use of inert material fabricated into the form of a crucible and placed as a liner inside the cooled crucible. In practice, however, molten material has exhibited a tendency to flow to the outside of the liner, either by permeation of the liner if it is porous, or by direct flow over the top lip of the liner under the influence of capillary forces if the liner is wet by the molten material. Moreover, such liners are generally subject to thermal shock, especially in crucibles of the size needed for commercial production operations on a large scale. Excessive thermal shock can cause fissures in the liner, and the molten material may flow through such fissures to the cooled walls of the crucible.

Once the space between the liner and the cooled crucible is partially or completely filled with the molten material, due to flow of the molten material through or over the liner, the improved thermal efficiency initially provided by the liner is substantially reduced due to the proximity of convecting molten material to the cooled crucible walls. This thermal "short circuit" is a particular problem in long term runs such as are associated with production type operations.

Accordingly, it is an object of this invention to provide an improved crucible for heating or evaporating material in a molten pool.

Another object of the invention is to provide a crucible having improved thermal efficiency which is not subject to deterioration.

A further object of the invention is to provide a low cost, simple to construct, crucible having improved thermal efficiency.

A more particular object of the invention is to provide a crucible, for evaporating a material which includes aluminum, having a high thermal efficiency.

Another more particular object of the invention is to provide a crucible, for evaporating iron or a related element or alloy, having a high thermal efficiency.

Other objects of the invention will become apparent to those skilled in the art from the following description taken in connection with the accompanying drawings wherein:

FIGURE 1 is a schematic full section view of apparatus constructed in accordance with the invention;

FIGURE 2 is a fragmentary schematic section view of an alternative embodiment of the invention;

FIGURE 3 is a fragmentary schematic section view of another alternative embodiment of the invention;

FIGURE 4 is a fragmentary schematic section view of a further alternative embodiment of the invention; and FIGURE 5 is a fragmentary schematic section view of a still further alternative embodiment of the invention.

Very generally, the apparatus of the invention is adapted for heating material in a molten pool 11 by the application of heat directly to the pool surface, such as by an electric arc or an electron beam 12. The apparatus includes a crucible 10 comprising an outer receptacle 14 adapted to be supported for operation and being provided with means 18, 19 and 21 for removing heat therefrom. The outer receptacle contains a bed 22 formed for confining the molten pool a distance from the outer receptacle. The bed is comprised of particulate material which is of limited reactivity with the molten material. The particulate material is also of a particle size and composition to maintain convecting molten material a distance from the outer receptacle and provide a barrier to heat transfer from the molten pool to the outer receptacle. To accomplish the latter characteristic, the particulate material may be selected to be non-wettable by the molten material, under operating conditions, over a substantial distance from the outer receptacle. Additionally or alternatively, the particulate material may be selected to be sufficiently inhibitive of convection currents, even in wetted regions, as to provide the desired heat transfer barrier. In either case, convecting molten material is thereby prevented from flowing to the outer receptacle, avoiding thermal short circuits.

Referring now more particularly to FIGURE 1, apparatus in accordance with the invention is illustrated. A molten pool 11 of, for example, aluminum, is contained in a crucible 10 (more fully described below) within an evacuated environment, the limits of which are not illustrated, and is bombarded by an electron beam 12 produced by an electron gun 13. The energy transmitted to the pool by the electron beam is sufficient to cause the aluminum to vaporize. The vapor thus produced is utilized to coat a substrate, not illustrated, disposed with the crucible in the vacuum environment.

The crucible structure includes an outer cooled receptacle 14 in the shape of a cylindrical pot. This particular shape, however, is by way of illustration only, since other shapes may be utilized within the scope of the invention. The receptacle is supported for operation by a pair of support struts 16 and 17 and may be constructed of copper. Coolant passages 18 are provided in the walls of the outer receptacle 14 and suitable conduits 19 and 21 are provided communicating therewith for conducting a coolant, such as water, to and from the coolant passages. Accordingly, heat is removed from the outer receptacle upon circulation of coolant through the passages and through an external heat exchanger, not illustrated.

The aluminum or other reactive material in the molten pool 11 would normally not react with the water-cooled copper outer receptacle because of the formation of a skull of solid material. Thermal inefficiencies, however, result due to conduction of heat through the skull from direct contact with convecting molten material, as previously explained. To increase thermal efficiency, the outer receptacle 14 contains a bed 22 of particulate material. A dish is formed in the upper surface of the bed 22 for confining the molten pool 11 a distance from the outer receptacle. The formation of the dish in the bed may be accomplished by scooping out a quantity of the particulate material or by imbedding a solid plug of the aluminum or other reactive material in the top surface of the bed prior to beginning melting operations. If the melting operation is to be carried out in a vacuum, it is usually desirable before melting is begun to heat the particulate material bed to outgas the bed and reduce the potential for contamination of the melt and reduction of the vacuum during operation.

The particulate material may be of a crushed, granular or powder form, and selection of the particular form used will normally depend upon the environmental operating conditions. To prevent contamination of the melt, the particulate material is selected to have a limited reactivity with the molten material. As used herein, this term includes materials which, although exceeding desired reactivity levels above certain temperatures, are below the desired reactivity levels below temperatures attainable in the bed 22.

The particulate material is also selected to be of a composition which is a good thermal insulator and which will confine or maintain the convecting molten material a distance from the receptacle 14 which establishes a barrier to the flow of heat from the pool to the receptacle. A substantial temperature gradient may exist over this distance. The actual distance by which the convecting molten material is separated from the receptacle depends upon the amount of heat transfer which can be tolerated, the temperature gradient desired and the thermal conduction characteristics of the bed 22.

Separation of convecting molten material from the receptacle 14 may be maintained by selecting a particulate material for the bed 22, which is not extensively wetted by the molten material. The property of wettability (and hence the distance or depth which the molten material wets or permeates the bed) depends upon the nature of the particulate and molten materials involved, including their relative reactivity and the surface tension of the molten material. Additional factors include temperature, atmosphere, particle size and pressure. Selection of a satisfactory particulate material, through which the molten material will not permeate a significant distance, thereby includes selection of a satisfactory particle size and a consideration of the environmental conditions in which it is desired to operate.

Alternatively, maintenance of the convecting molten material a distance from the outer receptacle 14, and provision of a desired temperature gradient over such distance, may be achieved using a wettable particulate material. In such a case, the wetted particulate material is selected to so inhibit convection currents that the desired heat transfer barrier may be achieved. Examples of such a construction are described below. The desired heat transfer barrier of the bed 22 may also be achieved by utilizing a combination of the convection current inhibition provided by wetted particulate material and the thermal barrier provided by non-wetted particulate material. Such a construction is explained below.

By utilizing a particulate material which does not become extensively wetted by the molten material, the molten material will not readily permeate the bed 22 or pass over the top lip of the bed by capillary action. In the case of molten aluminum, a satisfactory particulate material for the bed has been found to be powdered silicon nitride having a particle size of about 200 to 400 mesh. Other particle sizes may also be satisfactory, but the particular material mentioned was found to satisfy the criteria of limited reactivity, and the ability to confine the pool and provide a heat transfer barrier. In operation, and referring to FIGURE 1, the aluminum in the molten pool 11 wets the silicon nitride of the bed 22 only to a depth of about 1/4 to 3/8 inches into the powder. The aluminum in the wetted layer of powder reacts with the silicon nitride to form a solid shell 23 of aluminum nitride. The temperature drop across the shell is sufficient to bring the aluminum below the temperature at which it will wet or chemically react with the silicon nitride powder (about 1300° C. to 1400° C.). The remaining unwetted powder acts as an excellent thermal barrier for improving thermal efficiency. The combination of the shell 23 and the remaining powder in the bed maintains convecting molten material to the limits of the pool 11. Thus, a desired temperature gradient across the bed may be achieved without excessive heat removal from the outer receptacle.

Operation under the above conditions has been found satisfactory where molten aluminum in the pool 11 was at a temperature of the order of 1500° C. to 1700° C. and was evaporated at a rate in the range of 1/10 to 1 pound of aluminum per hour per square inch of evaporant surface. The temperature drop across the 1/4 to 3/8 inch aluminum nitride shell 23 brought the temperature of the aluminum to the order of 1300° C. to 1400° C. Below these temperatures, the aluminum did not wet the silicon nitride. The shell 23 thus formed is resistant to thermal shock and will therefore ordinarily not fissure extensively. However, small cracks may develop in it during operation, but these are of no consequence. This is because, as long as the bed 22 is intact, and it is intact because of its particulate nature, the bed will prevent further penetration of molten aluminum, once temperatures of 1300° C. to 1400° C. are reached.

At this point, and referring back to FIGURE 1, it may be noted that the shell 23 may be preformed and inserted as a solid structure of inert material into the particulate material in the bed 22. In the case of a molten aluminum pool, the solid structure may be of aluminum nitride. Although the structure 26 may, as previously mentioned, be subject to thermal shock and resultant fissuring, the bed 22 may include a suitable particulate material to prevent permeation as previously described. The use of a preformed shell 23 may provide convenience in certain situations. For example, if the feed material for the molten pool 11 is in powdered form, the solid shell may aid in start-up operations by initially separating the powdered feed material from the powdered material of the bed 22. The use of a preformed shell may also permit utilization of a less inert material for the particulate portion of the bed if the shell is thick enough to drop the temperature of the molten material below its reactive temperature with the particulate material before it contacts the particulate material.

Although aluminum and silicon nitride are a workable combination, they are given only as being representative of satisfactory conditions. By utilizing the concepts taught herein, a person skilled in the art will be able to readily determine other types of powders for other types of molten materials. For example, in the case of molten aluminum in pool 11, aluminum nitride in particulate form may be included in the bed 22. In this case, the reaction forming the solid shell previously described does not take place, but rather, the aluminum penetrates the powdered bed a certain distance. The bed in the region of penetration, although wet by the molten material, exerts an inhibitive effect on convection currents in such region. This causes a temperature gradient in the wetted region until the temperature of the molten aluminum is sufficiently low (about 1300° C.) that it no longer wets the powder.

Such a condition is illustrated in FIGURE 2 by the dotted line 24, signifying the limit of penetration by the molten aluminum. The unwetted powder remains as a barrier to further permeation of the cooled molten aluminum, and provides thermal insulation. Moreover, the absence of convection currents in the wet powder which the molten aluminum penetrates also contributes significantly to reducing thermal losses. As an example, satisfactory results with aluminum nitride have been obtained under operating conditions similar to those used with silicon nitride and with a particle size as coarse as about 20 mesh.

By way of further example, where stainless steel comprises the molten pool 11, a satisfactory material for utilization in the bed 22 is tungsten carbide powder. Good results have been obtained using a tungsten carbide particle size of about 20 to 50 mesh. Tungsten carbide powder is thoroughly wet by stainless steel and related elements or alloys such as iron, cobalt, nickel, etc., at any temperature above their melting points. Accordingly, the permeation of the molten material into the powder may be significantly more than was the case in connection with aluminum and aluminum nitride. Nevertheless, the thickness of the bed 22 may be selected such that a sufficient temperature gradient exists across the wetted portion of the bed 22 (due to the inhibition of convection currents by the wetted powder) to bring the molten material to its solidification temperature before it reaches the walls of the cooled receptacle 14. The material will, at this point, form a solid skull 25 (see FIGURE 3).

Under many conditions, satisfactory operation is obtainable even if the skull 25 forms immediately adjacent the outer receptacle 14. Such a case, with the skull formed by solidification of the molten material immediately adjacent the outer receptacle, is illustrated in FIGURE 5. In either the case of FIGURE 3 or of FIGURE 5, the absence of convection currents in the wet powder between the skull 25 and the molten pool provides a substantial improvement in thermal efficiency. This is because circulating or convecting molten material is maintained far enough from the outer receptacle as to provide a substantial thermal barrier and prevent excessive heat loss.

As has been previously described, tungsten carbide powder may be utilized in the bed 22 when melting iron and related elements and alloys, such as stainless steel. Tungsten carbide powder, however, is presently relatively expensive. A more inexpensive bed utilizing less tungsten carbide may be formed as illustrated in FIGURE 4. In this arrangement, a layer 27 of tungsten carbide powder is disposed adjacent the molten pool 11. Although the tungsten carbide layer 27 is not of sufficient thickness to provide a temperature gradient down to the solidification temperature of the material in the pool 11, it results in a layer of powder saturated with molten material. Such a saturated layer is quite stable physically and also has the property of being an essentially perfect barrier to convection currents.

In the absence of such convection currents, the saturated layer provides a temperature gradient. The thickness of the saturated layer may be made sufficient to enable the use of a material for the nontungsten carbide portion 29 of the bed 22 which is not as inert as tungsten carbide, but which is inert at the lowest temperature of the temperature gradient in the saturated layer (i.e., of limited reactivity). Thus, although the less inert material in the layer 29 of the bed 22 may react slowly with the material in the molten pool, the absence of convection currents in the saturated layer reduces the temperature of the molten material enough that reaction with the less inert material of the bed 22 does not occur. The less inert material of the bed 22 may thereby be selected to have better non-wetting properties relative to the molten material of the pool than does the material of the layer 27 (stainless steel and tungsten carbide, in the example). Thus, in the case of stainless steel, calcium oxide or aluminum nitride may be utilized in the layer 29. Even though molten transition elements will attack calcium oxide or aluminum nitride, the absence of convecting molten metal directly wetting or washing the calcium oxide or aluminum nitride, because of the interposition of the saturated tungsten carbide layer 27, eliminates the reaction problem.

As previously mentioned, the thickness of the layer 27 is made sufficient to have a temperature gradient so that the molten material drops below its reaction point with the less inert material utilized in the bed 22. The still molten material, although below the reaction temperature, may penetrate the bed 22 to a depth indicated by the dotted line 28. Nevertheless, the bed 22 may be made sufficiently thick that its non-wetting properties limit penetration so that the molten material does not reach the walls of the outer receptacle 14.

Generally speaking, in the multiple layer bed configuration illustrated in FIGURE 4, the major requirement for the material in the layer 27 is that it be inert relative to the molten material in the pool 11. The major requirement of the less inert material utilized in the bed 22 is that it be wettable by the molten material only for a short distance and that it be non-reactive with the molten material below a temperature which is easily reached by the temperature gradient provided in the layer 27. In the case of stainless steel, tantalum carbide and columbium carbide are satisfactory substitutes for the tungsten carbide in the layer 27. In some cases, pure refractory metal powders may be satisfactory for use in the layer 27 if their volatility is such that they would not evaporate from the molten pool, even when dissolved into the molten pool to the extent of their maximum solubility in it.

In addition to maintaining a high thermal efficiency which is not subject to deterioration over long periods of operation, crucible structures constructed in accordance with the invention provide several other advantages. Among such advantages is the fact that the thermal insulation or liner in the crucible structure need not be prefabricated by expensive molding or similar forming techniques. Instead, the liner may be readily fabricated merely by pouring the powder into the outer receptacle and producing a dish in the powder. No additional manufacturing operations are necessary. The invention in its various embodiments and modifications may be applied to permit melting of a wide variety of materials at high thermal efficiencies.

It may therefore be seen that the invention provides an improved crucible structure for containing a molten pool of reactive material. The crucible structure so provided has improved thermal efficiency which is not subject to deterioration over extended periods of operation. The crucible structure is low in cost, simple of construction and is applicable, among other things, to the melting of and evaporation of materials including aluminum, iron and related element sand alloys.

Various other embodiments of the invention in addition to those shown and described herein will become apparent to those skilled in the art from the foregoing description and accompanying drawings. Such other embodiments, and modifications thereof, are intended to fall within the scope of the appended claims.

What is claimed is:

1. A crucible of improved thermal efficiency adapted to contain a molten pool of given material comprising, an outer receptacle, means for removing heat from said outer receptacle, and a bed contained within said receptacle and formed for confining the molten pool a distance from said outer receptacle, said bed including particulate material having a limited reactivity with the molten material and being of a particle size and composition to maintain convecting molten material in contact therewith a distance from said outer receptacle and provide a barrier to heat transfer from the molten pool to said outer receptacle.

2. A crucible according to claim 1 wherein said particulate material is non-wettable by the molten given material, under operating conditions, over a substantial distance from said crucible.

3. A crucible according to claim 1 wherein said particulate material is wettable by the molten given material, under operating conditions, and is inhibitive of convection currents in the wetted region thereof.

4. A crucible according to claim 2 wherein a solid layer including the given material is positioned between the non-wetted portion of said particulate material and the molten pool.

5. A crucible according to claim 4 wherein a wetted layer of said particulate material is positioned between said solid layer and the molten pool.

6. A crucible according to claim 2 wherein said particulate material is substantially non-reactive with the given material.

7. A crucible according to claim 2 wherein said particulate material is reactive with the given material above a given temperature, and wherein a layer of non-reactive material is positioned between the molten pool and said particulate material and is of a thickness providing a temperature gradient to a temperature below the given temperature.

8. A crucible according to claim 7 wherein said non-reactive layer is a solid material.

9. A crucible according to claim 7 wherein said non-reactive layer is a particulate material.

10. A crucible according to claim 2 for use where the given material includes aluminum, wherein said particulate material comprises at least one of the nitrides of silicon and aluminum.

11. A crucible according to claim 8 for use where the given material is iron or a related element or alloy, wherein said layer comprises at least one of the carbides of tungsten, tantalum and columbium.

12. A crucible of improved thermal efficiency adapted to contain a molten pool of given material, comprising, an outer receptacle, means for removing heat from said outer receptacle, and a bed contained within said outer receptacle and formed for confining the molten pool a distance from said outer receptacle, said bed including a layer of particulate material which is of a particle size and composition to be non-wettable by the molten given material, under operating conditions, over a substantial distance from said outer receptacle, to provide a barrier to heat transfer from the molten pool to said outer receptacle.

13. A crucible of improved thermal efficiency adapted to contain a molten pool of given material, comprising, an outer receptacle, means for removing heat from said outer receptacle, and a bed contained within said outer receptacle and formed for confining the molten pool a distance from said outer receptacle, said bed including a layer of particulate material which is of a particle size and composition to be wettable by the molten given material, under operating conditions, and which is inhibitive of convection currents in the wetted region thereof to provide a barrier to heat transfer from the molten pool to said outer receptacle.

References Cited
UNITED STATES PATENTS

| | | | |
|---|---|---|---|
| 3,343,828 | 9/1967 | Hunt | 266—39 X |
| 3,345,059 | 10/1967 | Swindt | 263—48 X |

JOHN J. CAMBY, *Primary Examiner.*